US006775446B2

(12) United States Patent
Henze et al.

(10) Patent No.: US 6,775,446 B2
(45) Date of Patent: Aug. 10, 2004

(54) FLEXIBLE OPTIC FIBER CABLE WITH CENTERED, INTERFERENCE FIT FERRULES

(75) Inventors: Inka Henze, Udenheim (DE); Brigitte Sommer, Mainz (DE); Michael Weisser, Sturbridge, MA (US); Loic Barbedette, Dudley, MA (US)

(73) Assignee: Schott Glas, Mainz (DE)

(*) Notice: Subject to any disclaimer, the term of this patent is extended or adjusted under 35 U.S.C. 154(b) by 246 days.

(21) Appl. No.: 10/119,056

(22) Filed: Apr. 9, 2002

(65) Prior Publication Data

US 2003/0202760 A1 Oct. 30, 2003

(51) Int. Cl.[7] ............................................. G02B 6/04
(52) U.S. Cl. ..................... 385/115; 385/80; 385/100; 385/116; 385/120; 385/121; 385/137
(58) Field of Search ..................... 385/80, 100, 115, 385/116, 120, 121, 137

(56) References Cited

U.S. PATENT DOCUMENTS

| 3,624,816 A | | 11/1971 | Strack et al. ............... 350/700 |
| 3,830,667 A | | 8/1974 | Carpenter .................. 156/155 |
| 5,013,128 A | | 5/1991 | Stern et al. ................. 385/115 |
| 5,386,489 A | * | 1/1995 | Stokes ....................... 385/100 |
| 6,068,796 A | | 5/2000 | Graham et al. ............ 261/1.28 |

FOREIGN PATENT DOCUMENTS

| DE | 2651378 | | 6/1977 | ............ G02B/5/14 |
| DE | 3744367 | | 8/1989 | ............ C03B/2/40 |
| DE | 3620368 | | 7/1990 | ............ G02B/6/44 |
| DE | 19732051 | | 5/1998 | ............ G02B/6/36 |
| JP | 59172605 A | * | 9/1984 | ............ G02B/5/17 |

OTHER PUBLICATIONS

PCT International Search Report for PCT Application No. PCT/US03/07054.

* cited by examiner

Primary Examiner—Akm Enayet Ullah
Assistant Examiner—Daniel Petkovsek
(74) Attorney, Agent, or Firm—Volpe and Koenig, P.C.

(57) ABSTRACT

A flexible optic fiber cable is provided having a plurality of optic fibers grouped together as a fiber bundle with a flexible center section, in which the optic fibers are moveable relative to adjacent fibers in the fiber bundle, and two non-flexible end sections. Each of the two non-flexible end sections includes a generally uniform thickness protective layer extending over an outer surface thereof starting at a position spaced inwardly from a free end of the end section. A ferrule is located around and in an interference fit with the protective layer so that the end section is centered in the ferrule. An adhesive is located between the ferrule and the non-flexible end section from the position spaced inwardly from the free end of the end section to the free end thereof to connect the ferrule to the non-flexible end section.

15 Claims, 2 Drawing Sheets

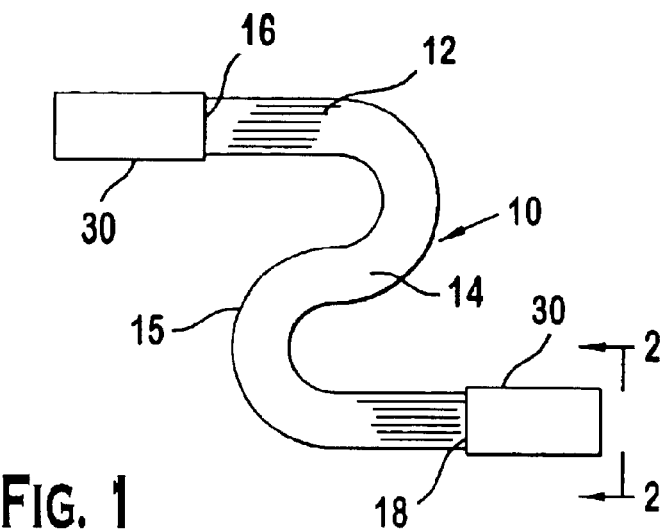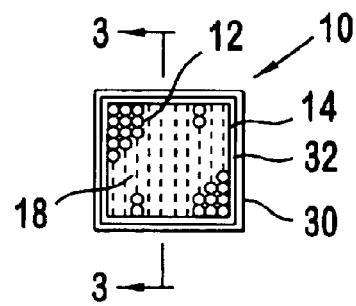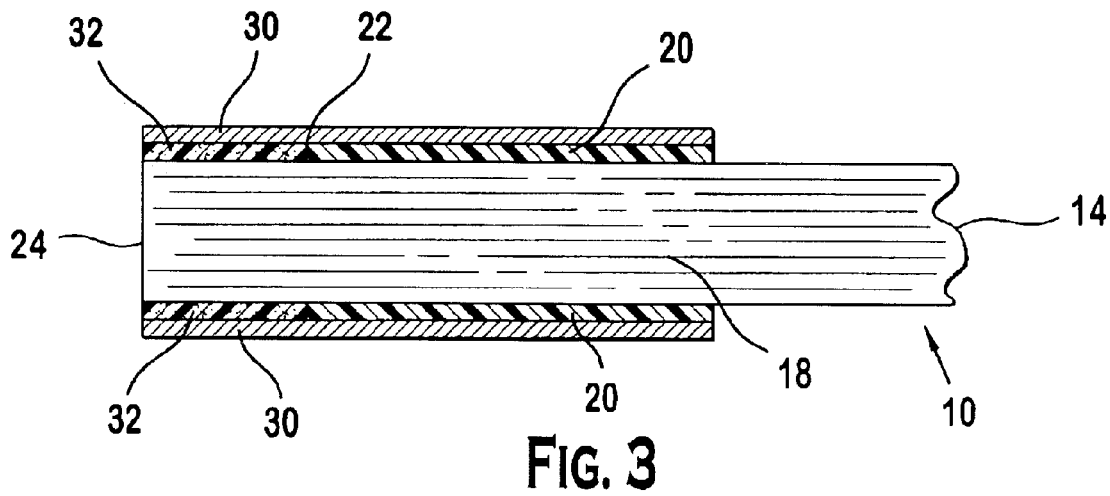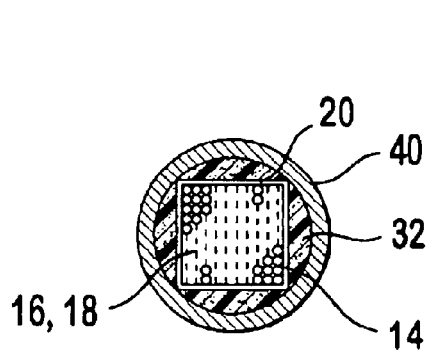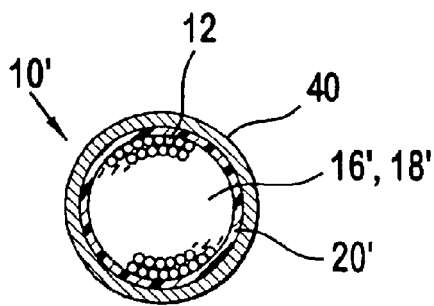

FLEXIBLE OPTIC FIBER CABLE WITH CENTERED, INTERFERENCE FIT FERRULES

BACKGROUND

The present invention relates to imaging optic fibers, and in particular to fiber optic cables having a flexible center section and non-flexible end sections held in protective ferrules.

It is known in the art of imaging optic fibers and optic fibers for signal transmission to create a fiber optic bundle by heating and drawing glass fibers which are spaced apart by or encapsulated in leachable spacers in order to form a fused optic fiber bundle. The ends of the optic fiber bundle are masked or protected, and the bundle is then placed in a leaching agent which leaches the leachable spacers from center section of the bundle between the protected ends. This results in the center section being flexible. The bundle is preferably covered with a protective sheath to form a flexible optic fiber cable.

Generally, ferrules or casings are attached to the non-flexible end sections in order to protect the end sections from damage and to allow the end sections to be connected in connectors. This can be done prior to or after leaching. While it is desired that the end sections of the optic fiber bundle be centered within the ferrules, typically, the optic fibers cannot be justified within the ferrule since the optic fibers will settle to the lower side of the ferrule as the adhesive which attaches the end section of the optic fiber bundle to the ferrule cures. While a ferrule having smaller inside dimensions can be utilized, this can lead to problems with the insertion of the end sections of the fiber optic bundle into the ferrule and the destruction of the outside optic fibers of the bundle.

Additionally, for optic fiber bundles made with fiberglass or synthetic fibers, the ferrules have typically been crimped onto the outside of the ends of the fiber optic bundle. Since the diameter of the optic fiber bundle may vary widely based upon the size of the fibers and variations in production conditions, the crimping of the ferrule onto the bundle often leads to a connection that is either too loose if the diameter of the bundle is small, or to damage or destruction of the outer fibers, if the diameter of the bundle is too large.

It would be desirable to provide a flexible fiber optic cable and a process for producing such a cable that has the advantage of not compressing the ferrule on the end section of the optic fiber bundle, and which allows for a centering of the end sections of the optic fiber bundle in the ferrules. It would also be desirable to provide an optic fiber cable assembly and a process for assembling such a cable which would result in less damage to the fibers of the end sections in the cable.

SUMMARY

Briefly stated, the present invention provides a flexible optic fiber cable having a plurality of optic fibers grouped together as a fiber bundle with a flexible center section, in which the optic fibers are moveable relative to adjacent fibers in the fiber bundle, and two non-flexible end sections, in which the plurality of optic fibers are joined together in a predetermined arrangement. Each of the two non-flexible end sections includes a generally uniform thickness protective layer extending over an outer surface thereof starting at a position spaced inwardly from a free end of the end section. A ferrule is located around and in an interference fit with the protective layer so that the end section is centered in the ferrule. An adhesive is located between the ferrule and the non-flexible end section from the position spaced inwardly from the free end of the end section to the free end thereof to connect the ferrule to the non-flexible end section.

In another aspect, the invention provides a method of manufacturing an optic fiber cable having a flexible center section and two non-flexible end sections. The method includes the steps of:

coating each of the end sections with a generally uniform protective layer;

removing a portion of the protective layer from each of the end sections from a position spaced inwardly from a free end of each of the end sections to the respective free ends thereof;

inserting each end section into a ferrule that has an interference fit with the protective layer, centering the end section in the respective ferrule; and adhering each of the ferrules to the respective end sections with an adhesive located between each of the ferrules and the respective end sections from the position spaced inwardly from the free end of each of the respective end sections to the respective free ends thereof.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements shown.

FIG. 1 is a view of a flexible optic fiber cable in accordance with the present invention.

FIG. 2 is an end view showing the ferrule on the end section of the flexible optic fiber cable shown in FIG. 1.

FIG. 3 is a cross-sectional view through an end section of the fiber optic cable of FIG. 1.

FIG. 4 is a transverse cross-sectional view of an alternate embodiment of an end section for the flexible optic fiber cable in accordance with the invention.

FIG. 5 is a transverse cross-sectional view of a second alternate embodiment of an end section of a flexible optic fiber cable in accordance with present invention.

DETAILED DESCRIPTION OF THE PREFERRED EMBODIMENTS

Figure 6:
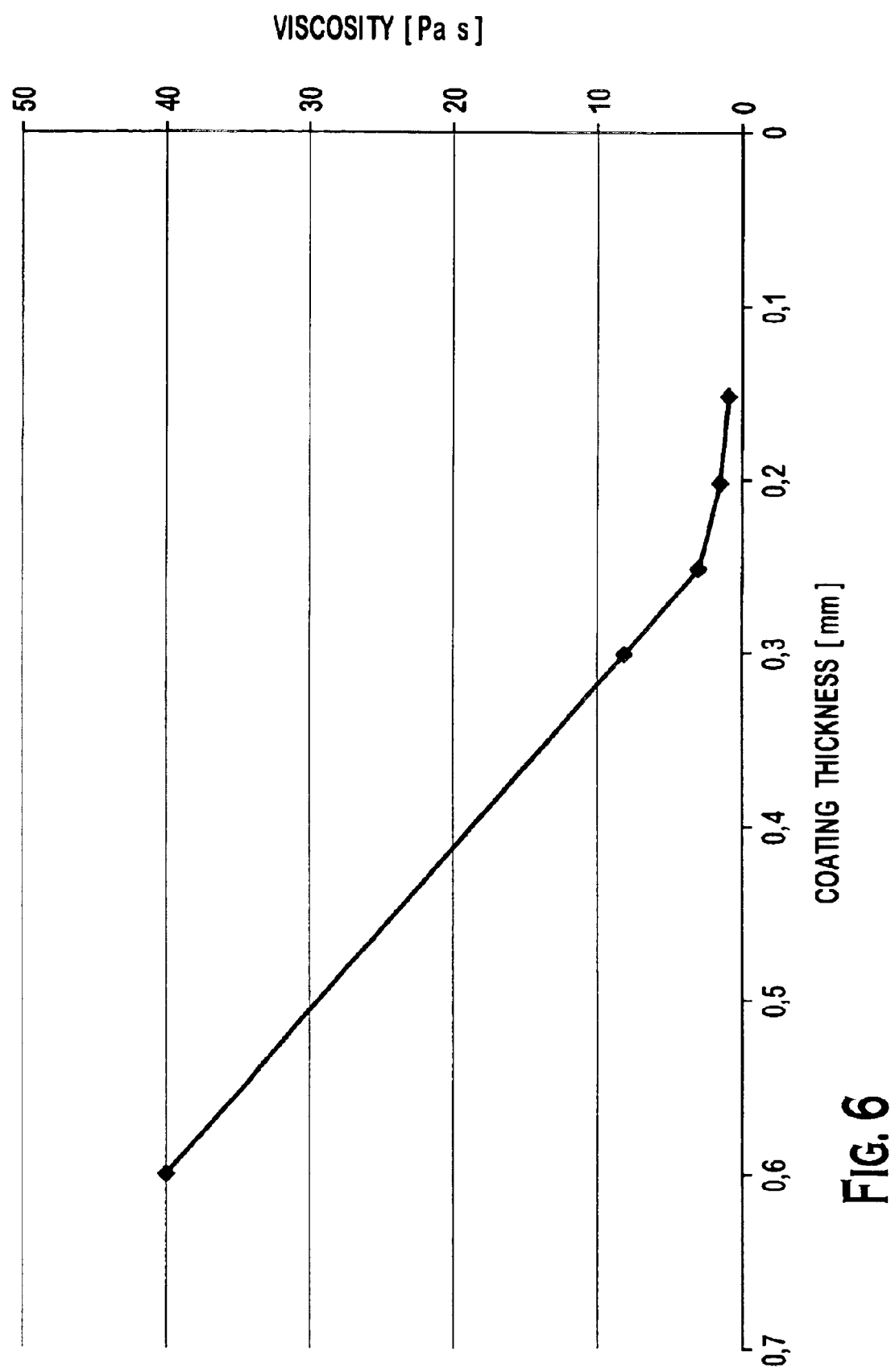
FIG. 6 is a graph showing the relationship between the coating viscosity and the coating thickness.

Certain terminology is used in the following description for convenience only and is not considered limiting. The terms "a" and "one" are defined as including one or more of the referenced item unless specifically noted. The term "array" as used herein is intended to include any type of ordered, two-dimensional arrangement of fiber ends, such as for a flexible image bundle.

Referring now to FIG. 1, a flexible optic fiber cable 10 is shown. The cable 10 includes a plurality of optic fibers 12 grouped together to form a fiber bundle 14 having a flexible center section 15 in which the optic fibers 12 are moveable relative to adjacent fibers 12 in the fiber bundle 14 and two non-flexible end sections 16, 18 in which the plurality of optic fibers 12 are joined together in a predetermined arrangement, for example as shown in FIG. 2.

As shown in FIG. 3, each of the two non-flexible end sections 16, 18 includes a generally uniform thickness protective layer 20 extending over an outer surface of the fiber bundle starting at a position 22 spaced inwardly from a free end 24 of the end section 16, 18. The protective layer 20 is preferably a machineable wax, and in a preferred embodiment is ISOLOX-TG, produced by Loeffler GMBH, Offenbach, Germany. This type of wax is typically used as a protective wax against corrosion, but has been found to be extremely useful in the present application. This wax liquefies at between 80° C., and 90° C., which is a higher temperature than that typically used in the fiber bundle etching process. While this type of machineable wax is preferred, other types of protective coatings or waxes could be used in accordance with the present invention.

The wax is preferably applied by dipping of the end section 16, 18 of the fiber in bundle 14. The thickness of the wax coating is influenced by the dipping process. The hotter the wax, the lower its viscosity and the thinner the wax coating. This relationship between the coating thickness and the viscosity for the preferred wax is shown in FIG. 6. Accordingly, the thickness of the wax can be controlled to a great extent with coatings of approximately 0.15 mm being possible. Preferably, the thickness of the wax coating on the fiber bundle 14 is approximately 0.25 mm to about 5 mm. More preferably, the thickness is in the range of 1 mm–3 mm, and most preferably is approximately 1.0 mm. After the protective layer 20 has been applied, the end portion of the protective layer is removed or machined off between the point 22 and the free end 24 of the end section 16, 18.

Still with reference to FIGS. 2 and 3, a ferrule 30 is located around and in an interference fit with the protective layer 20 so that the end section 16, 18 is centered in the ferrule 30. The outside cross-sectional area of the protective layer 20 is preferably slightly greater than the internal cross-sectional area of the ferrule 30 so that there is an interference fit and an exertion force is necessary in order to press the ends 16, 18 of the fiber bundle 14 into the respective ferrules 30. Excess wax (or other coating material) is then abraded off during this insertion. Preferably, the ferrule 30 is made of metal. However, it can be made of synthetic material and may be made with various internal and external cross-sections in order to match the geometric form of the fiber optic cable ends 16, 18.

It is also possible to utilize a ferrule having an internal cross-sectional area that is different than the external cross-sectional area of the fiber bundle end, as shown in FIG. 4. In FIG. 4, a round ferrule 40 is utilized in connection with a fiber bundle 14 having a square cross-sectional area. Only the corners of the wax coated fiber optic bundle 14 contact the inner surface of the ferrule 40 because of the geometry of the cross-section. However, this is sufficient for centering the end section 16, 18 of the fiber bundle 14 within the ferrule 40. In an example produced in this manner, a fiber optic bundle 14 with a square cross-section was produced with the edge lengths of approximately 3 mm. This was centrally fixed in a ferrule 40 having a round cross-section with an inner diameter of 4 mm, and outer diameter of 6 mm and a length of 2.5 cm.

Referring again to FIG. 3, an adhesive 32 is located between the ferrule 30 and the non-flexible end sections 16, 18 from the position 22 spaced inwardly from the free end 24 of the end section 16, 18 to the free end 24 thereof. Preferably the adhesive is a two-component epoxy resin which features minimal shrinkage upon curing in order to prevent separation from the inner surface of the ferrule 30. Other adhesives such as acrylic or silicon resins may also be utilized.

Preferably, the length of the ferrule 30 is greater than a transverse cross-sectional dimension of the end section 16, 18. For example, for fiber bundles having a round cross-sectional area, the inner diameter of the ferrule 30 should be greater than the diameter of the fiber bundle. For fiber bundles having a square or other cross-sectional shape, the inside dimension of the ferrule is preferably longer than the largest transverse dimension across the cross-sectional area. This helps to ensure that the fiber bundle end 16, 18 is centered in the ferrule 30.

Referring now to FIG. 5, an alternate embodiment of the fiber optic cable 10' is shown in which the fiber bundle end sections 16', 18' have a round cross-section. The ferrule 40 also has a round cross-section. The wax layer 20' has a sufficient thickness such that an interference fit is produced between the wax layer 20' and the inner surface of the ferrule 40 upon installation of the ferrule 40 on the fiber bundle end section 16', 18'.

In order to produce an optic fiber cable 10 with the flexible center section 14 and the non-flexible end section 16, 18, the end sections 16, 18 of the fiber bundle are coated with a generally uniform layer of wax 20. A portion of the layer of wax 20 is then removed from each of the end sections 16, 18 from a position 22 spaced inwardly from the free ends 24 of each of the end sections 16, 18 to the respective free end 24 thereof. Each end section 16, 18 is then inserted into the ferrule 30, 40. The ferrule has an interference fit with the layer of wax 20 resulting in a centering of the end section 16, 18 in the respective ferrule as it is installed. The ferrule 30, 40 is adhered to the respective end section 16, 18, with an adhesive 32 located between the ferrule and the respective end section from the position 22 spaced inwardly from the free end of the end section 16, 18 to the free end 24 thereof.

For the case when the optic fiber cable 10 is formed from a fused bundle 14 of glass optic fibers 12 spaced apart by leachable spacers, the center section 14 of the cable 10 is leached in order to dissolve the leachable spacers such that the optic fibers 12 in the center section 15 are free to move relative to one another. To the extent that the fiber optic cable 10 is formed from fiberglass or synthetic fibers, the end sections 16, 18 are held together through an adhesive process and leaching of the center section is not required. However, installation of the ferrule 30, 40 on the end section 16, 18 is also advantageous in these cases since it eliminates the damage caused by the prior known crimped-on metal casings utilized with synthetic fibers.

The fiber optic cable 10, 10' in accordance with the present invention and process for forming it has the advantage that no compression of the ferrule 30, 40 around the end sections 16, 18 of the fiber optic bundle 14 is necessary. Furthermore, the coating process evens out small irregularities in the geometry of the cross-section of the fiber optic cable 10 and creates a smooth surface area for installation of the ferrule. By monitoring the wax application and the outside diameter of the wax layer 20, difficulties due to variations in the cross-sectional area of the optic fiber bundle can be eliminated and a justified placement of the end section 16, 18 of the optic fiber bundle 14 within the ferrule 30, 40 is possible with an extremely high accuracy, which in production provides an alignment within be about 1%.

While the present invention has been described in terms of generally square and round cross-sections for the optic fiber bundle and ferrules, those skilled in art will recognize that a multitude of configurations for the cross-sections of the ends of the optic fiber bundles is possible and a suitable ferrule shape may also be utilized.

While the preferred embodiments of the invention have been described in detail, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A flexible optic fiber cable, comprising a plurality of optic fibers grouped together as a fiber bundle having a flexible center section in which the optic fibers are movable relative to adjacent fibers in the fiber bundle and two non-flexible end sections in which the plurality of optic fibers are joined together in a predetermined arrangement, each of the two non-flexible end sections including:

a generally uniform thickness protective layer extending over an outer surface thereof starting at a position spaced inwardly from a free end of the end section;

a ferrule located around and in an interference fit with the protective layer so that the end section is centered in the ferrule; and an adhesive located between the ferrule and the non-flexible end section from the position spaced inwardly from the free end of the end section to the free end thereof to connect the ferrule to the non-flexible end section.

2. The flexible optic fiber cable of claim 1, wherein the bundle of optic fibers is drawn together with a plurality of leachable spacer fibers, and the flexible center section is leached so that the fibers can move relative to one another.

3. The flexible optic fiber cable of claim 1, wherein the protective layer is a machinable wax that can withstand leaching.

4. The flexible optic fiber cable of claim 1, wherein the ferrule is generally square in cross-section.

5. The flexible optic fiber cable of claim 1, wherein the ferrule is generally round in cross-section.

6. The flexible optic fiber cable of claim 1, wherein the ferrule is made of a polymeric material.

7. The flexible optic fiber cable of claim 1, wherein the ferrule is made of a metallic material.

8. The flexible optic fiber cable of claim 1, wherein the protective layer is a wax layer having a thickness of about 0.25 mm to about 5 mm.

9. The flexible optic fiber cable of claim 1, wherein the ferrule has a different geometric form than the end section, and the protective layer contacts an inner surface of the ferrule at spaced apart contact areas.

10. The flexible optic fiber cable of claim 1, wherein the ferrule has an inner diameter that is greater than a transverse cross-sectional dimension of the end section.

11. Method of manufacturing an optic fiber cable having a flexible center section and two non-flexible end sections, comprising:

coating the end sections with a generally uniform protective layer;

removing a portion of the protective layer from each of the end sections from a position spaced inwardly from a free end of each of the end sections to the free ends thereof;

inserting each end section into a ferrule having an interference fit with the protective layer, centering the end section in the respective ferrule; and adhering the ferrule to the respective end section with an adhesive located between the ferrule and the respective end section from the position spaced inwardly from the free end of the end section to the free end thereof.

12. Method of claim 11, wherein the fiber optic cable is formed from a fused bundle of optic fibers and leachable spacers, further comprising leaching the center section after the end sections have been coated.

13. Method of claim 11, wherein the adhesive is a two-component epoxy.

14. Method of claim 11, wherein the step of removing a portion of the layer of wax comprises machining the protective layer at the free end of the end section.

15. Method of claim 11, wherein the protective layer is a wax, and the coating of the end sections comprises dipping the end sections in hot wax.

* * * * *